United States Patent
Stephens et al.

(10) Patent No.: US 12,298,137 B2
(45) Date of Patent: May 13, 2025

(54) CELESTIAL NAVIGATION OBJECT AVAILABILITY USING LIGHT SOURCE ENABLED SATELLITES

(71) Applicant: Honeywell International Inc., Charlotte, NC (US)

(72) Inventors: Trevor Keith Stephens, Maple Grove, MN (US); Brian Schipper, Maple Grove, MN (US); Ross Merritt, Minneapolis, MN (US)

(73) Assignee: Honeywell International Inc., Charlotte, NC (US)

( * ) Notice: Subject to any disclaimer, the term of this patent is extended or adjusted under 35 U.S.C. 154(b) by 239 days.

(21) Appl. No.: 18/295,746

(22) Filed: Apr. 4, 2023

(65) Prior Publication Data
US 2024/0337494 A1    Oct. 10, 2024

(51) Int. Cl.
*G06V 20/56* (2022.01)
*G01C 21/02* (2006.01)

(52) U.S. Cl.
CPC ........... *G01C 21/025* (2013.01); *G06V 20/56* (2022.01)

(58) Field of Classification Search
CPC .............................. G01C 21/025; G06V 20/56
See application file for complete search history.

(56) References Cited

U.S. PATENT DOCUMENTS

| | | |
|---|---|---|
| 9,909,866 B2 | 3/2018 | Karlov et al. |
| 10,782,134 B1 | 9/2020 | Biren et al. |
| 11,132,905 B2 | 9/2021 | Kindaichi et al. |
| 2016/0320174 A1 | 11/2016 | Geswender et al. |
| 2021/0033400 A1 | 2/2021 | Belenkii et al. |

FOREIGN PATENT DOCUMENTS

| | | |
|---|---|---|
| CN | 111735460 A | 10/2020 |
| CN | 114485624 A | 5/2022 |
| EP | 4027173 A1 | 7/2022 |
| JP | 2022070191 A | 5/2022 |

OTHER PUBLICATIONS

European Patent Office, "Extended European Search Report", dated Oct. 14, 2024, from from EP Application No. 24162574.8, from Foreign Counterpart to U.S. Appl. No. 18/295,746, pp. 1 through 11, Published: EP.

*Primary Examiner* — Mathew Franklin Gordon
(74) *Attorney, Agent, or Firm* — Fogg & Powers LLC

(57) ABSTRACT

A method and system for celestial navigation are provided. The method comprises requesting access to a light source on a low earth orbit (LEO) satellite; and sending an uplink message to the LEO satellite to power on the light source, in response to the access request. The method further comprises determining whether the LEO satellite is in view of a camera; capturing a light image, from the light source, on a focal plane location of the camera when the LEO satellite is in view of the camera; and comparing the focal plane location to a predicted location of the LEO satellite. The method updates position information of a user based on an observation error from comparing the focal plane location to the predicted location.

11 Claims, 5 Drawing Sheets

CELESTIAL NAVIGATION OBJECT AVAILABILITY USING LIGHT SOURCE ENABLED SATELLITES

BACKGROUND

Celestial navigation is a Global Positioning System (GPS) denied navigation technology, which aims at solving commercial and defense needs of navigating in GPS-jammed or GPS-contested environments. Celestial navigation technology utilizes optical observations made by a star tracker of both stars and satellites, which are typically low earth orbit (LEO) objects. Currently, there are operational limitations for celestial navigation based on when satellites can be visibly observed by the star tracker. In particular, there is limited object visibility during the day and around midnight.

Satellites are best seen at terminator conditions (near sunrise and sunset) since these satellites are optically observable due to reflected visible light. Operation during daytime conditions is difficult, because the background light from the sun is in-band with the reflected light from the satellites. Moreover, operation during times that are near midnight are also difficult or impossible (the so-called "midnight hole" issue) because the satellites fall within the earth's shadow and no reflected light reaches the star tracker.

SUMMARY

A method and system for celestial navigation are provided. The method comprises requesting access to a light source on a low earth orbit (LEO) satellite; and sending an uplink message to the LEO satellite to power on the light source, in response to the access request. The method further comprises determining whether the LEO satellite is in view of a camera; capturing a light image, from the light source, on a focal plane location of the camera when the LEO satellite is in view of the camera; and comparing the focal plane location to a predicted location of the LEO satellite. The method updates position information of a user based on an observation error from comparing the focal plane location to the predicted location.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1:
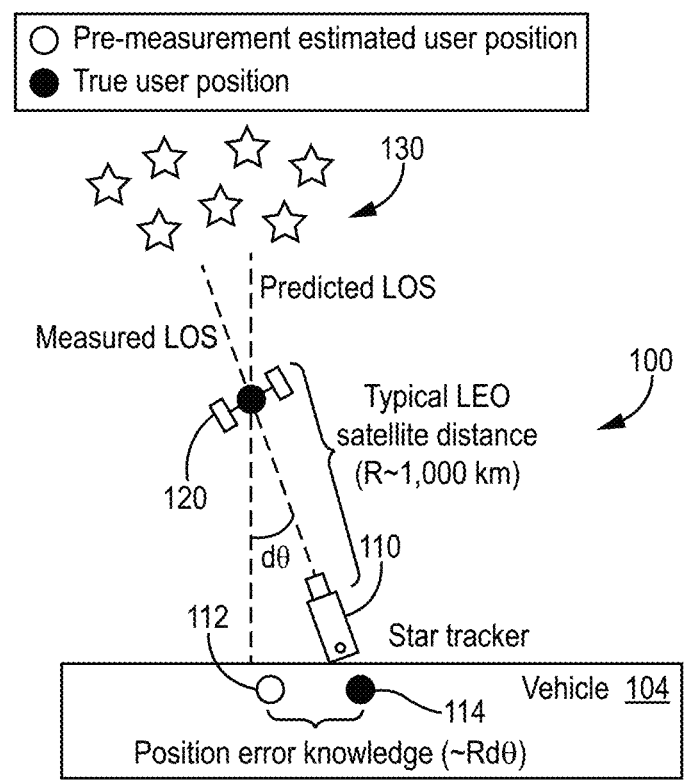
FIG. 1 is a schematic illustration of a system for celestial navigation of a vehicle, according to an exemplary embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

A method and system to provide celestial navigation object availability using light source enabled satellites is described herein.

In one implementation, the present method enhances celestial navigation by using infrared (IR) light source emitters affixed to low earth orbit (LEO) satellites. Satellites equipped with light source emitters, such as IR light emitters, can more easily be observed with a star tracker of a celestial navigation system. The present method greatly enhances the ability to accurately (lower error) and reliably (longer availability) navigate using celestial navigation.

The present approach is useful on multiple fronts for overcoming current problems with celestial navigation. For example, the present method provides for better tracking during the day (e.g., IR light is easier to filter out from background light), and prolonged observability around midnight (e.g., no need to utilize reflected light). In addition, the present method can be implemented with minimal changes to existing celestial navigation tracking software. For example, a centroid of an object on an image plane is still reported, as the algorithm for celestial navigation needs to know the centroid of various objects on the image plane.

The present approach overcomes prior problems of celestial navigation by enabling continuous nighttime tracking, even when objects fall within the earth's shadow during the hours around midnight, as well as making daytime tracking easier in that optical observations out-of-band from the sun light can be made. This allows for easier optical filtering to get rid of the sun light.

In addition, another benefit of the present approach in providing for daytime tracking is that IR light can be matched to similar wavelengths of starlight, and a single narrow-band optical filter can be used to capture both stars and IR-enabled satellites with the star tracker. This improves the current situation of observing both stars and reflected light from satellites, which requires a compromise in signal strength when observing both.

The present approach provides the advantage of extending operation of a celestial navigation system during the time around midnight, such as by enabling direct observation of a IR light source on the satellite; and extending operation of the celestial navigation system during the time around noon, such as by enabling bandpass filtered observations of the IR light source to eliminate background sunlight.

The present method also allows for planning the on/off periods of the IR light from satellites. This is possible because during a majority of the satellite orbit, the IR light emitter does not need to be turned on. The ability to turn on and off the light source only when needed also conserves power. For example, some initial estimates of the power required for an IR light emitter on a LEO satellite are conservatively about 80 W, with potential for as low as 8 W depending on star tracker capabilities.

Additionally, during times when GPS is available, the IR light emitters would not need to be turned on at all, and would only need to be used during potential times of threats when GPS is taken out. These operational capabilities dramatically save power consumption of the satellites. In some implementations, a subscription-based service can be provided to allow for controlling the on/off periods and usage of the satellite light emitters.

In addition, the present method allows for observing the satellite light sources from ground-based measuring equipment (i.e., outside of normal navigation operations) in order to improve satellite ephemeris modelling.

Further, the present approach provides for an active system that is not easily jammable. For example, a specific IR wavelength can be tailored to deter others from easily leveraging the present capability. As such, only those users that know the IR wavelength can design a star tracker to optimally observe the satellites.

In addition, as IR light is not visible to the naked eye, use of IR light sources on LEO satellites would not add to light pollution.

Further details regarding the present approach are described as follows and with reference to the drawings.

Celestial Navigation Overview

Celestial navigation is accomplished using a star tracker to observe stars and resident space objects (RSOs), which are typically low earth orbit (LEO) satellites. The apparent angular position of the RSOs relative to the star background exposes user position error for navigation purposes. Stars emit their own light and RSOs rely on reflected light from the sun to be able to observe the RSOs. The RSOs are typically not visible during a period of time around midnight (for about 4 hours) due to no reflected light from the sun. The RSOs are also typically not visible during a period of time around noon (for about 4 hours) due to too much background light from the sun.

In contrast to conventional celestial navigation systems, which cannot operate reliably during the periods of time when RSOs are not visible, the present celestial navigation system can be available for use at any time. For example, in one implementation, the RSOs such as LEO satellites can be equipped with an infrared (IR) light source. This approach solves the above problems, as during the time around midnight, a star tracker can directly observe the IR light source. In addition, during the time around noon, the star tracker can directly observe the IR light source by employing a bandpass filter to eliminate out-of-band sunlight.

FIG. 1 is a schematic illustration of a system 100 for celestial navigation of a vehicle 104, which can be implemented with the present approach. The system 100 includes a star tracker 110 (including a camera) mounted on vehicle 104, with star tracker 110 in view of a LEO satellite 120. An apparent angular position of satellite 120 (with known ephemeris) relative to a well-known star background 130 exposes a user position error. For example, a pre-measurement estimated user position 112 and a True user position 114 are obtained and employed by a processor to determine position error knowledge (~Rdθ) of star tracker 110. In this example, using a typical LEO satellite range (R) of about 1,000 km for satellite 120, a measured line of sight (LOS) is compared to a predicted LOS to obtain an observation error angle (dθ). Updated position information for the vehicle is then obtained based on the observation error angle.

Figure 2:
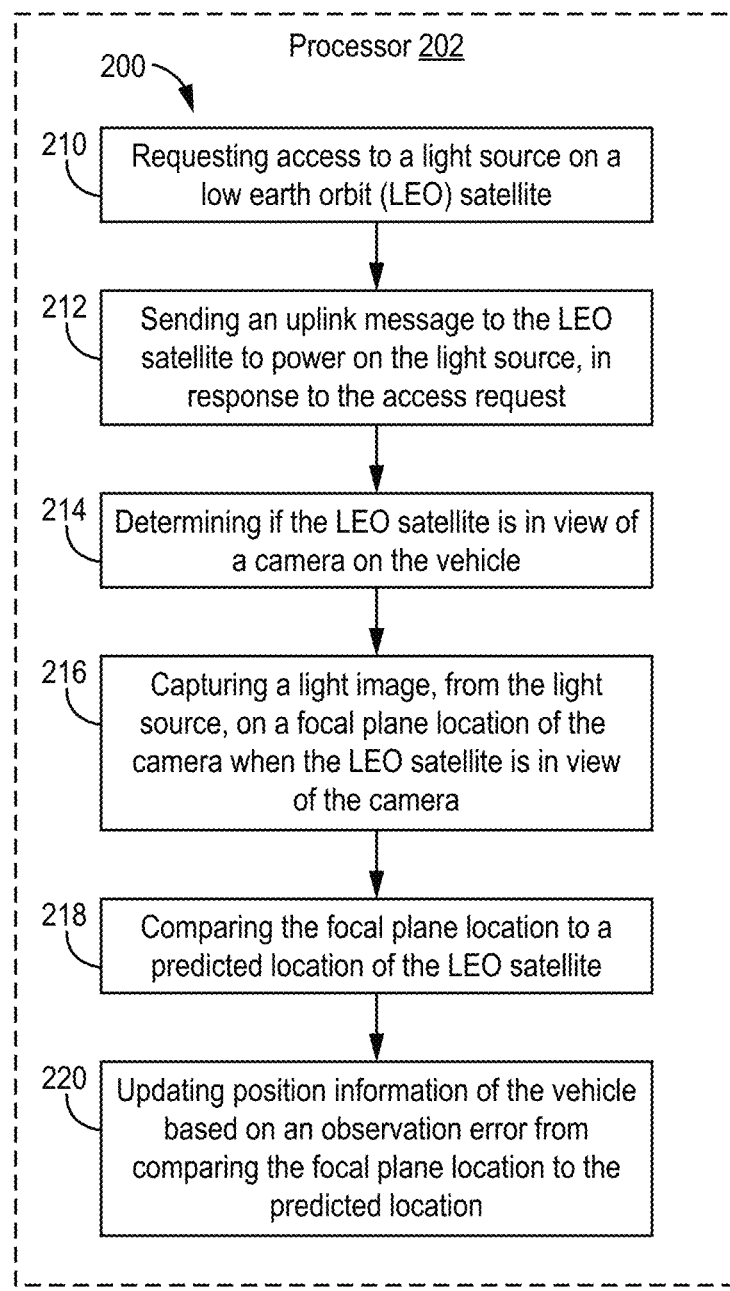
FIG. 2 is a flow diagram of a method for celestial navigation of a vehicle, according to an exemplary implementation.

FIG. 2 is a flow diagram of a method 200 for celestial navigation of a vehicle, such as vehicle 104 (FIG. 1), according to an exemplary implementation of the present approach. The method 200 provides for celestial navigation object availability using light source enabled LEO satellites, such as IR equipped LEO satellites. At least one processor 202 in the vehicle can be used to execute program instructions to perform method 200.

The method 200 comprises requesting access to a light source on a LEO satellite (block 210); sending an uplink message to the LEO satellite to power on the light source, in response to the access request (block 212); determining if the LEO satellite is in view of a camera (e.g., coupled to a star tracker) on the vehicle (block 214); capturing a light image, from the light source, on a focal plane location of the camera when the LEO satellite is in view of the camera (block 216); comparing the focal plane location to a predicted location of the LEO satellite (block 218); and updating position information of the vehicle based on an observation error from comparing the focal plane location to the predicted location (block 220).

Satellite Visibility

Figure 3:
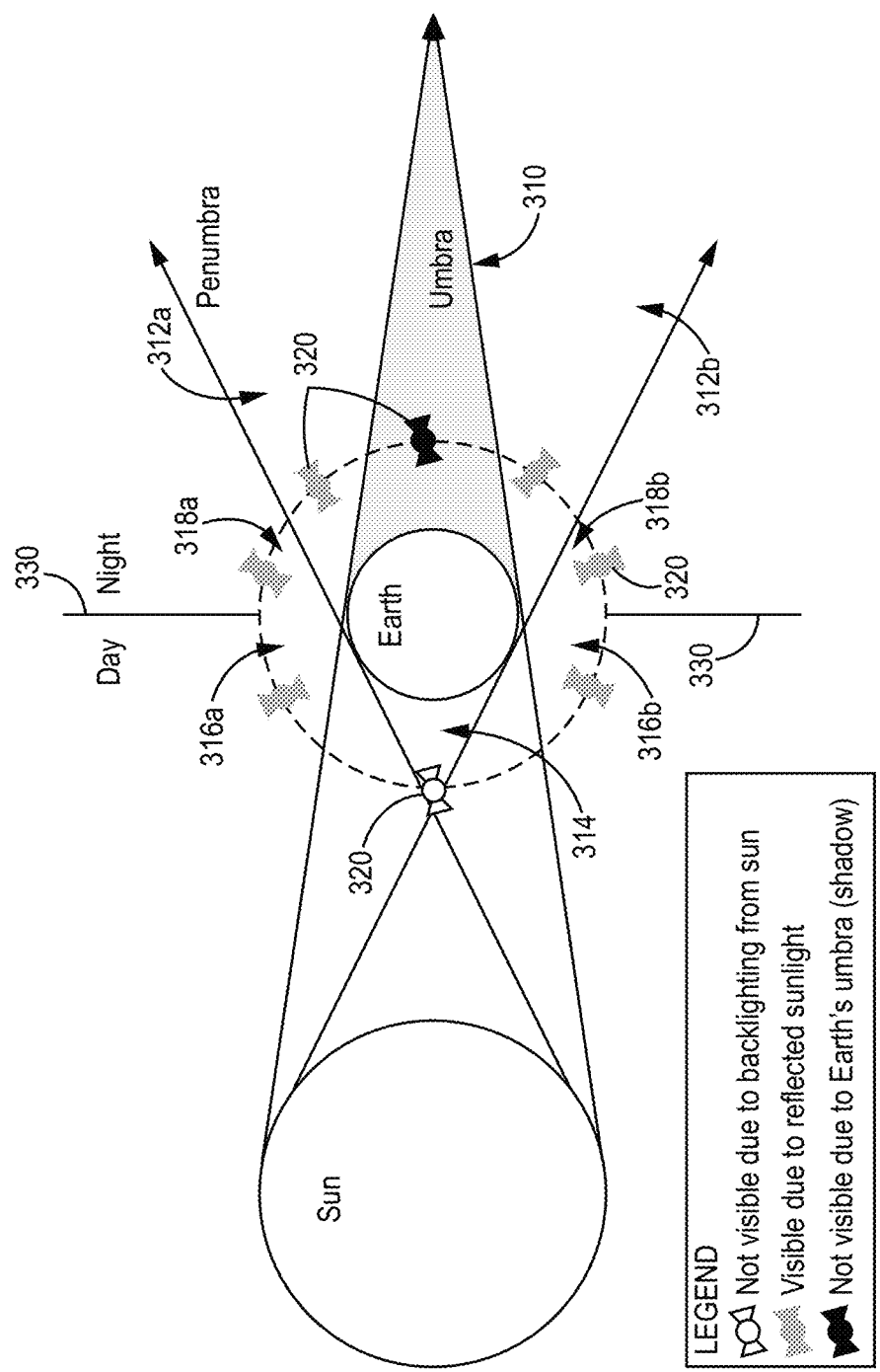
FIG. 3 is a schematic illustration of satellite visibility from the Earth when using a celestial navigation system.

FIG. 3 is a schematic illustration of satellite visibility from the Earth when using a celestial navigation system. As shown, there are two conical areas of shadow that trail the Earth in the direction opposite from the Sun, an umbra region 310 and a penumbra region 312. The umbra region 310 is the central part of the shadow where sunlight is totally blocked. The penumbra region 312 is the lighter part of the shadow where the sunlight is partially obscured. Outside of umbra region 310 and penumbra region 312, there are various illuminated regions around the Earth where the sunlight is not obscured. These include a sun backlight region 314, reflected sunlight regions 316a and 316b during the day, and reflected sunlight regions 318a and 318b at night. As an LEO satellite 320 orbits the Earth, the LEO satellite 320 passes through these various shadow and illuminated regions.

For example, during the day for a few hours around noon (e.g., 10 am to 2 pm), LEO satellite 320 is located in backlight region 314 and thus is not visible due to the backlighting effects from the Sun. When LEO satellite 320 moves outside of backlight region 314 into reflected sunlight region 316a, LEO satellite 320 becomes visible due to reflected sunlight. The LEO satellite 320 still remains visible as it passes from day to night, at terminator 330, and into reflected sunlight region 318a. The LEO satellite 320 still remains visible as it passes into penumbra region 312 due to the reflected sunlight in penumbra region 312. However, during the night for a few hours around midnight (e.g., 10 pm to 2 am), LEO satellite 320 is not visible when it passes into umbra region 310. When LEO satellite 320 passes out of umbra region 310 back into penumbra region 312, LEO satellite 320 again becomes visible due to the reflected sunlight. As LEO satellite 320 continues its orbit, it passes from penumbra region 312 into reflected sunlight region 318b (night), and then into reflected sunlight region 316b during the day.

When LEO satellite 320 has a light source such as an IR source according to the present approach, a star tracker can overcome the sun's backlighting effects in backlight region 314 by using a bandpass filter focused on the IR wavelength, which is out-of-band from the sun. In addition, the star tracker can overcome the lack of reflected sunlight in umbra region 310 by observing the IR light directly from LEO satellite 320.

Figure 4:
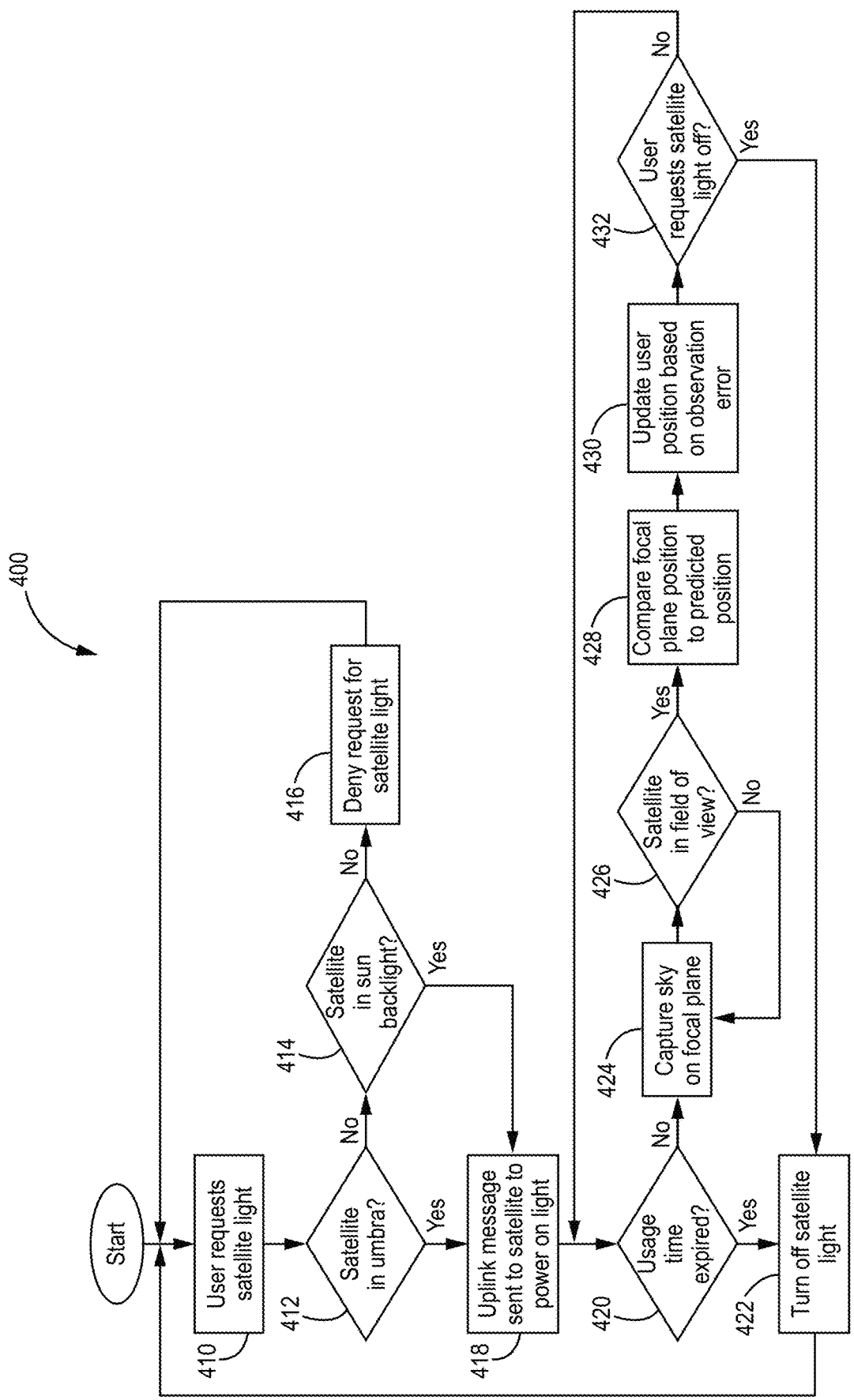
FIG. 4 is a flow diagram of a method for celestial navigation, according to a further implementation.

FIG. 4 is a flow diagram of a method 400 for celestial navigation, according to a further implementation. At the start, method 400 sends a user request for satellite light, such as by requesting access to a IR source on an LEO satellite (block 410). The method 400 then determines whether the requested satellite is in the umbra of the Earth (block 412). If the satellite is not in the umbra, method 400 determines whether the satellite is in the sun backlight region (block 414). If the satellite is not in the sun backlight region, method 400 denies the request for the satellite light (block 416) and returns to the start to await a further user request. If method 400 determines that the requested satellite is in the umbra (at block 412), or that the satellite is in the sun backlight region (at block 414), method 400 sends an uplink message to the satellite to power on the light source (block 418).

The method 400 then determines whether a light usage time on the satellite has expired (block 420). If the usage time has expired, method 400 sends an uplink message to turn off the satellite light (block 422). If the light usage time has not expired (at block 420), method 400 captures a sky image on a focal plane of a camera (block 424). The method 400 then determines whether the satellite is in the field of view of the camera (block 426). If not in the field of view, method 400 returns to block 224 to capture another sky image on the focal plane. When the determination is made that the satellite is in the field of view (at block 426), method 400 compares the focal plane position to a predicted position of the satellite (block 428). The method 400 then updates a user position based on any observation error between the focal plane position and the predicted position of the satellite (block 430).

The method 400 then determines whether there are any user requests to turn off the satellite light (block 432). If yes, method 400 returns to block 422 to send an uplink message to turn off the satellite light. If there are no user requests to turn off the satellite light (at block 432), method 400 returns to block 420 to determine whether the light usage time has expired. If not, method 400 repeats the above process starting at block 424 until there is a user request to turn off the satellite light, or the light usage time has expired. Once the satellite light is turned off (at block 422), method 400 returns to the start to await a further user request for satellite light.

Computation for IR Light Source on Satellites

The following assumptions can be made for computations related to using IR light sources on LEO satellites. A distance (d) from the satellite to an observer is about 1,000 km, and is converted to distance in parsec (dpc) as $3.24e^{-11}$ parsec. Assuming light can be observed as dim as an apparent magnitude (m) of 9, this can be converted to absolute magnitude (M) via the equation:

$$M = m - 5 \cdot \log_{10}(d_{pc}/10)$$
$$M = 66.45.$$

A luminosity (L) can be computed via the following equation:

$$L = L_0 \cdot (10^{\frac{-M}{2.512}})$$

where, $L_0 = 3.0128e^{28}$ is luminosity of the sun,
L=106.5 W.

Accordingly, the IR light source needs to be roughly 100 W to be visible from a typical LEO satellite. This is not insignificant, but does fall within the power budget of most satellites (assumed to be about 1 kW). Note, by assuming an optical observability of m=10 and a distance to the object d=500 m, the IR light source reduces by an order of magnitude (L=10 W).

Figure 5:
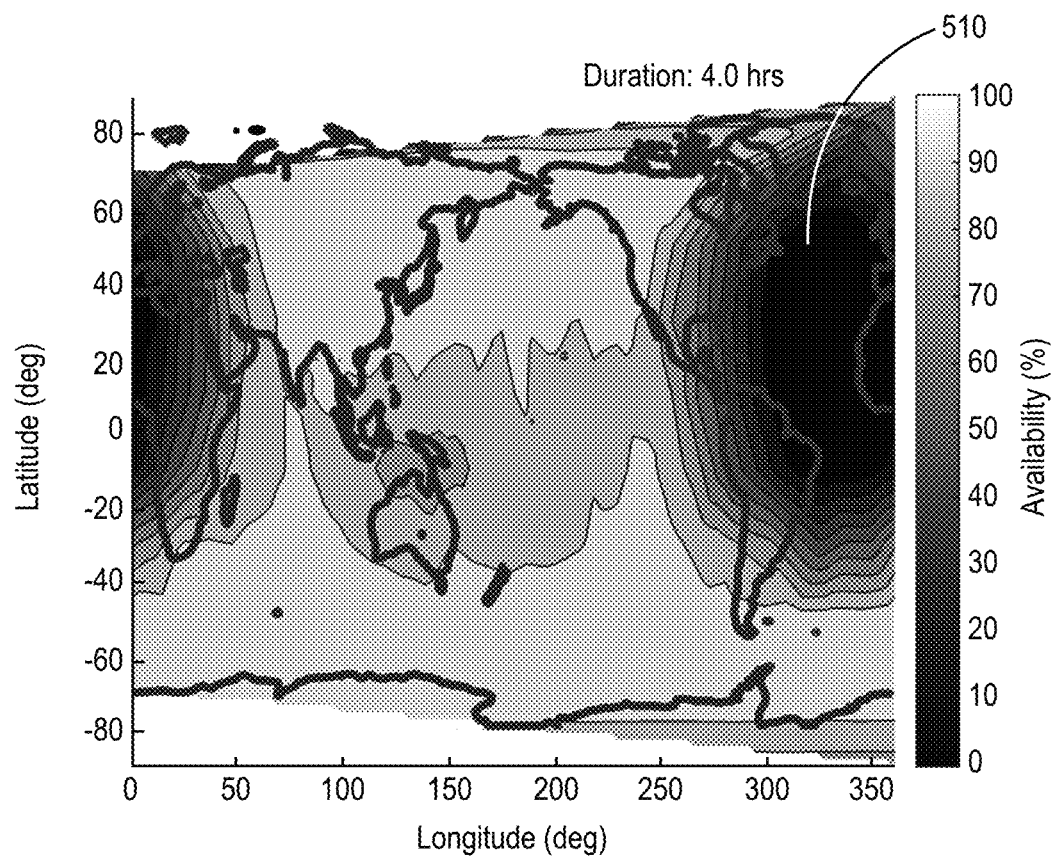
FIG. 5 is a graphical representation of the percentage of time satellite observations are available for a 4 hour period during a day, according to one example.

FIG. 5 is a graphical representation showing the percentage of time satellite observations are available for a 4 hour period during a day, according to one example. A percentage of satellite availability scale is on the right side of the graph, with the darkest portion of the scale at 0% availability (bottom), with the scale gradually getting lighter to the lightest portion at 100% availability (top). A darker area 510 in the graph, centered at around 330 degrees longitude, indicates 0% satellite availability. This is due to the "midnight hole" issue, which is caused by the penumbra region. During the time of this 4 hour window, the Sun is located on the opposite side of the Earth from around 330 degrees longitude. The present method and system for celestial navigation allow for continuous nighttime tracking during this 4 hour window.

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present systems and methods.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a method for celestial navigation, the method comprising: requesting access to a light source on a low earth orbit (LEO) satellite; sending an uplink message to the LEO satellite to power on the light source, in response to the access request; determining whether the LEO satellite is in view of a camera; capturing a light image, from the light source, on a focal plane location of the camera when the LEO satellite is in view of the camera; comparing the focal plane location to a predicted location of the LEO satellite; and updating position information of a user based on an observation error from comparing the focal plane location to the predicted location.

Example 2 includes the method of Example 1, wherein the light source comprises an infrared (IR) light source.

Example 3 includes the method of any of Examples 1-2, wherein the camera is mounted on a vehicle.

Example 4 includes the method of Example 3, wherein the camera is coupled to a star tracker on the vehicle.

Example 5 includes a system for celestial navigation, the system comprising: a vehicle; a camera coupled to a star tracker on the vehicle; at least one processer in the vehicle and in operative communication with the camera, wherein the at least one processor is operative to execute program instructions to perform a method comprising: requesting access to a light source on a LEO satellite; sending an uplink message to the LEO satellite to power on the light source, in response to the access request; determining whether the LEO satellite is in view of the camera; capturing a light image, from the light source, on a focal plane location of the camera when the LEO satellite is in view of the camera; comparing the focal plane location to a predicted location of the LEO satellite; and updating position information of the vehicle based on an observation error from comparing the focal plane location to the predicted location.

Example 6 includes the system of Example 5, wherein the light source comprises an IR light source.

Example 7 includes a method for celestial navigation, the method comprising: sending a user request to access a light source on a LEO satellite; determining whether the LEO satellite is in an umbra of Earth; if the LEO satellite is not in the umbra, then determining whether the satellite is in a Sun backlight region; if the LEO satellite is not in the Sun backlight region, then denying the user request to access a light source; if the LEO satellite is in the umbra or is in the Sun backlight region, then sending an uplink message to the LEO satellite to power on the light source; determining whether a light usage time on the LEO satellite has expired; if the light usage time has expired, then sending an uplink message to turn off the light source; if the light usage time has not expired, then capturing a sky image on a focal plane of a camera; determining whether the LEO satellite is in a field of view of the camera; if the LEO satellite is not in the field of view of the camera, capturing another sky image on the focal plane; when the LEO satellite is in the field of view of the camera, comparing a focal plane position to a predicted position of the LEO satellite; and updating a user position based on an observation error between the focal plane position and the predicted position of the LEO satellite.

Example 8 includes the method of Example 7, further comprising: determining whether there is a user request to turn off the light source; if there is a user request to turn off the light source, then sending an uplink message to the LEO satellite to turn off the light source; if there is no user request to turn off the light source, then determining whether the light usage time has expired; if the light usage time has expired, then sending an uplink message to the LEO satellite to turn off the light source.

Example 9 includes the method of any of Examples 7-8, wherein the light source comprises an IR light source.

Example 10 includes the method of any of Examples 7-9, wherein the camera is mounted on a vehicle.

Example 11 includes the method of Example 10, wherein the camera is coupled to a star tracker on the vehicle.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method for celestial navigation, the method comprising:
   requesting access to a light source on a low earth orbit (LEO) satellite;
   sending an uplink message to the LEO satellite to power on the light source, in response to the access request;
   determining whether the LEO satellite is in view of a camera;
   capturing a light image, from the light source, on a focal plane location of the camera when the LEO satellite is in view of the camera;
   comparing the focal plane location to a predicted location of the LEO satellite; and
   updating position information of a user based on an observation error from comparing the focal plane location to the predicted location.

2. The method of claim 1, wherein the light source comprises an infrared (IR) light source.

3. The method of claim 1, wherein the camera is mounted on a vehicle.

4. The method of claim 3, wherein the camera is coupled to a star tracker on the vehicle.

5. A system for celestial navigation, the system comprising:
   a vehicle;
   a camera coupled to a star tracker on the vehicle; and
   at least one processer in the vehicle and in operative communication with the camera, wherein the at least one processor is operative to execute program instructions to perform a method comprising:
   requesting access to a light source on a low earth orbit (LEO) satellite;
   sending an uplink message to the LEO satellite to power on the light source, in response to the access request;
   determining whether the LEO satellite is in view of the camera;
   capturing a light image, from the light source, on a focal plane location of the camera when the LEO satellite is in view of the camera;
   comparing the focal plane location to a predicted location of the LEO satellite; and
   updating position information of the vehicle based on an observation error from comparing the focal plane location to the predicted location.

6. The system of claim 5, wherein the light source comprises an infrared (IR) light source.

7. A method for celestial navigation, the method comprising:
   sending a user request to access a light source on a low earth orbit (LEO) satellite;
   determining whether the LEO satellite is in an umbra of Earth;
     if the LEO satellite is not in the umbra, then determining whether the satellite is in a Sun backlight region;
     if the LEO satellite is not in the Sun backlight region, then denying the user request to access a light source;
   if the LEO satellite is in the umbra or is in the Sun backlight region, then sending an uplink message to the LEO satellite to power on the light source;
   determining whether a light usage time on the LEO satellite has expired;

if the light usage time has expired, then sending an uplink message to turn off the light source;
if the light usage time has not expired, then capturing a sky image on a focal plane of a camera;
determining whether the LEO satellite is in a field of view of the camera;
   if the LEO satellite is not in the field of view of the camera, capturing another sky image on the focal plane;
when the LEO satellite is in the field of view of the camera, comparing a focal plane position to a predicted position of the LEO satellite; and
updating a user position based on an observation error between the focal plane position and the predicted position of the LEO satellite.

8. The method of claim 7, further comprising:
determining whether there is a user request to turn off the light source;
   if there is a user request to turn off the light source, then sending an uplink message to the LEO satellite to turn off the light source;
if there is no user request to turn off the light source, then determining whether the light usage time has expired;
   if the light usage time has expired, then sending an uplink message to the LEO satellite to turn off the light source.

9. The method of claim 7, wherein the light source comprises an infrared (IR) light source.

10. The method of claim 7, wherein the camera is mounted on a vehicle.

11. The method of claim 10, wherein the camera is coupled to a star tracker on the vehicle.

* * * * *